Patented Apr. 17, 1934

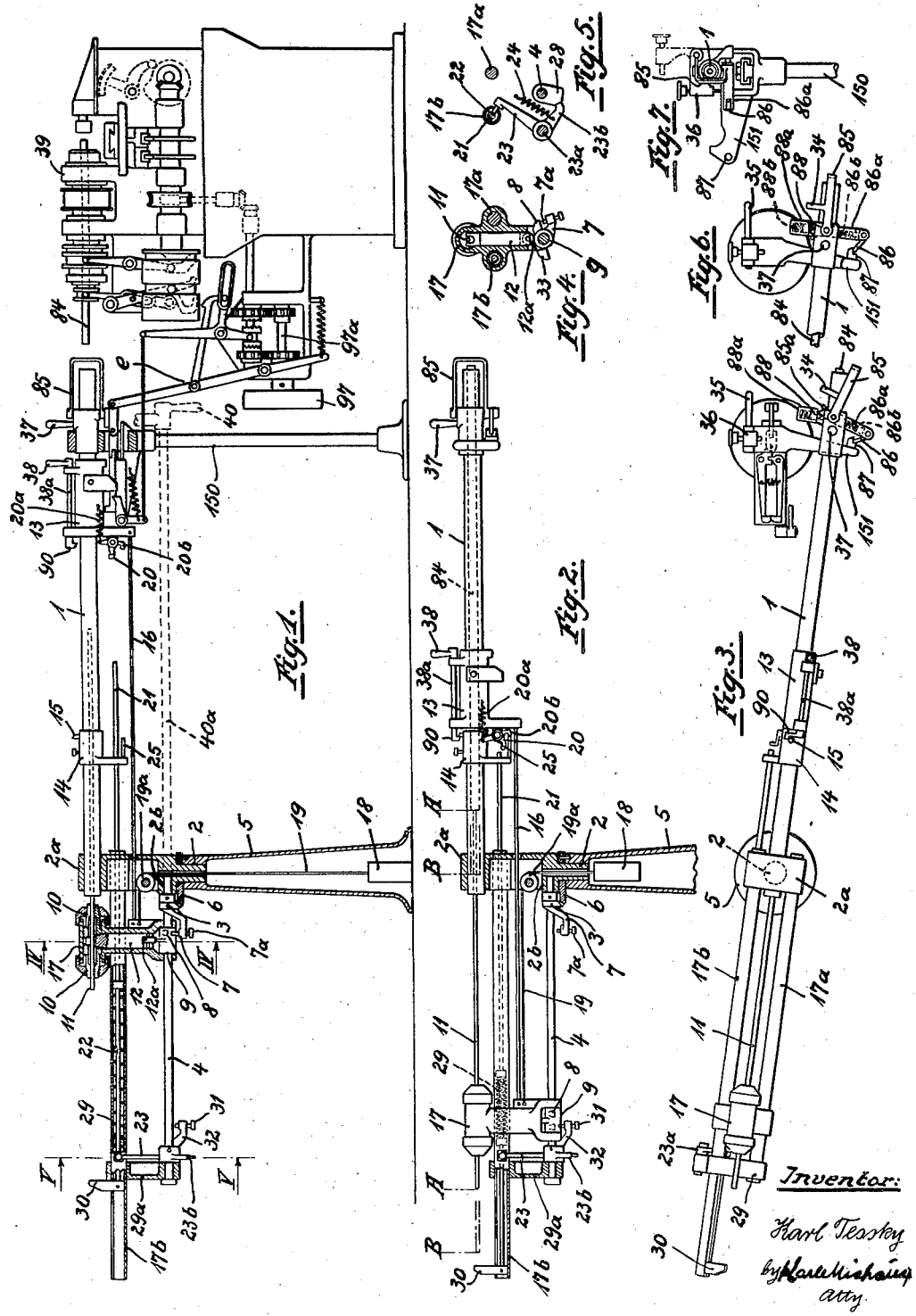

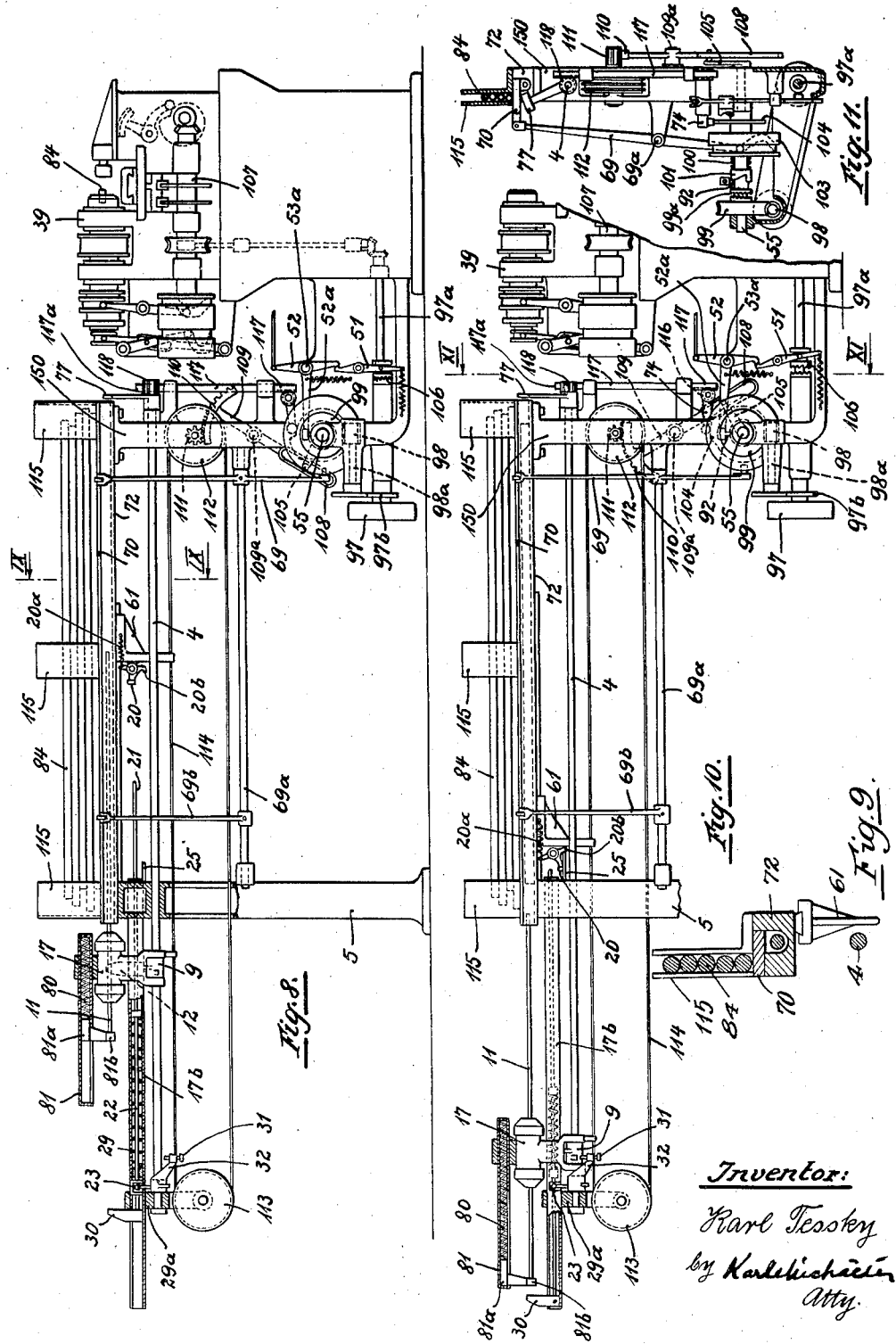

1,954,964

UNITED STATES PATENT OFFICE 1,954,964

DEVICE FOR FEEDING BAR STOCK TO MACHINE TOOLS

Karl Tessky, Esslingen-on-the-Neckar, Germany

Application January 11, 1933, Serial No. 651,178
In Germany January 20, 1932

8 Claims. (Cl. 29—60)

My invention relates to a device for feeding bar stock to machine tools, for instance to automatic lathes.

It is an object of my invention to provide a device for the purpose specified in which the influence of variations in the length of the bars fed to the machine tool is eliminated.

To this end I provide a push rod for pushing the bars into the machine and in combination with the push rod I provide means which, in the devices to be shown and described herebelow by way of example, is a spring-controlled rod, for applying the push rod to the front end of a bar from the stock and for moving the push rod, with the bar, toward the machine tool. I further provide means for presenting the push rod to the spring-controlled rod. This last-mentioned means, in the aforesaid devices, is a frame having chucking members for the push rod. Finally I provide means for making and breaking the connection of the presenting means or chuck frame to the push rod so that the push rod is presented to the spring-controlled rod in a position corresponding to the length of the bar which is being fed to the machine tool. By these means variations in the length of the individual bars are made up for.

In automatic machine tools and particularly in lathes, which are equipped with automatic means for feeding bar stock to the lathe, the rear end of the bars, i. e. that end from which the tooling operations are started, must be presented to the tools at the tooling station in such manner that it projects only a short distance from the chucking means of the lathe, so that the parting tool is just able to turn down the normally roughly severed rear end of the bar, whereupon, during the next succeeding operation of the control shaft of the lathe, the bar is pushed home to the check and the cutting tools can operate properly for tooling it.

In feeding devices as heretofore designed a slide or other member is provided which is permanently connected to the push rod and, as the member invariably performs strokes of equal length, the rear end of the push rod, i. e. that end which engages the bar, invariably moves to the same final position at the rear end of its stroke. Obviously proper operation, i. e., presenting the bar to the tools of the lathe at the tooling station, is only possible under these conditions if the bars of the stock are of substantially equal length as otherwise, with considerable variations in the lengths of the individual bars, the rear end of each bar projects farther from the chucking means of the lathe. The difficulties hereby created are particularly undesirable if the parts to be machined from the bar stock are short, for instance thin washers or the like. In such cases it may occur that the variations in the lengths of the bars exceed the thickness or length of the parts so that, when a fresh bar is presented to the tools of the lathe, the rear end of the bar is pushed home against the check without having first been prepared by the parting tool, and trouble and damage to the tools may be the result. In order to avoid trouble of this kind, and also in order to eliminate the high percentage of waste involved thereby, it is necessary that the bars of the stock should be of substantially equal length throughout. This means increased expense at least with bar stock exceeding a certain thickness.

This drawback and the necessity of exactly determining the length of the push rod are eliminated in the device according to the present invention in which the push rod is not permanently connected to the means for operating it, but is mounted to be displaced with respect to these means and to be connected to them in positions which correspond to the variable lengths of the bars.

In a preferred embodiment of my invention the device is so designed that the push rod is automatically moved to the position corresponding to the length of a given bar, and gripped by the rod-operating means under the control of the operations required for exchanging the bars.

It is another object of my invention to provide a feeding device whose operation is entirely automatic, i. e., in which not only the variations in the lengths of the individual bars are made up for automatically in the manner described, but in which also fresh bars are automatically presented to the push rod.

To this end, in combination with the make-up means, I provide a magazine for the bar stock and, preferably automatic means for presenting the bars from the magazine to the push rod.

In the drawings affixed to this specification and forming part thereof a device lacking and a device having a magazine and embodying my invention are illustrated diagrammatically by way of example.

In the drawings

Figs. 1 to 7 illustrate the device lacking a magazine in which the fresh bars are inserted at the rear end of a rocking tubular guide by hand, and Figs. 8 to 11 illustrate the device provided with a magazine and with automatic means for presenting the bars from the magazine to the push rod.

More particularly

Fig. 1 is a partly sectional elevation of the device lacking a magazine and of an automatic lathe to which it feeds bars, showing its parts in the position they assume before the insertion of a fresh bar, Fig. 2 is a partly sectional elevation showing part of the same device after a fresh bar has been inserted, Fig. 3 is a plan view of Fig. 1, showing the tubular guide at the end of its outward movement, Figs. 4 and 5 are sections on the lines IV—IV and V—V in Fig. 1, respectively, Fig. 6 is a plan view showing the rear end of the tubular guide in an intermediate position, Fig. 7 is an end elevation viewed from the right in Fig. 3, Fig. 8 is a partly sectional elevation of the device provided with a magazine, showing its parts in the position they assume before the feeding of a fresh bar, Fig. 9 is a section on the line IX—IX in Fig. 8, Fig. 10 is a partly sectional elevation showing part of the device after a fresh bar has been delivered from the magazine, and Fig. 11 is a section on the line XI—XI in Fig. 10.

Referring now to the drawings and first to Figs. 1 to 7, 1 is a tubular guide for the bar stock 84. 5 is a hollow upright in which a holder 2a for the guide 1 is mounted to oscillate about a hollow vertical pivot 2. 4 is a shaft which at its rear end is mounted to rotate in a bearing 2b on the upright 5. The front end of the shaft 4 is mounted to rotate in a bracket 29a which is secured on a frame consisting of a tube 17b and a rod 17a, the tube and the rod extending in parallel relation to the shaft 4 and being secured in the holder 2a with their rear ends.

Secured to the upper end of the upright 5 is a bevel-gear sector 6 which meshes with a bevel pinion 3 on the shaft 4. 7 is an arm which projects from the pinion 3 and is equipped with an adjustable dog 7a. 32 is an arm which is mounted on the shaft 4 near the bracket 29a and is equipped with an adjustable dog 31. The dogs on arms 7 and 32 are adapted to cooperate, respectively, with arms 8 and 33 on a cam 9, Fig. 4, which is mounted to rotate and to slide freely on the shaft 4. 12 is a vertical wedge member forming part of a chuck frame 17 for a push rod 11. The lower end of the vertical wedge member is equipped with a roller 12a which bears on the cam 9. The lower end of the chuck frame embraces the cam 9. The upper end of the wedge member has two oppositely inclined faces which engage between the inner ends of two chucking members 10, 10 at opposite ends of the chuck frame 17 for engaging the push rod 11 when the member 12 is raised by the cam 9. 28 is a fixed cam on the shaft 4 (Fig. 5). The chuck frame 17 is mounted to slide on the rod 17a and on the tube 17b and is equipped with a weight 18 which is mounted to move in the hollow upright 5 and is connected to the chuck frame by a cable 19 which is supported on a sheave 19a in the holder 2a, and secured to the chuck 17 at its upper end, so that it tends to move the chuck frame toward the automatic lathe 39, Fig. 1.

85 is a U-shaped check for the bar 84 which is pivotally mounted on the rear end of the tubular guide 1. 88 is a spring catch which is mounted to slide in a casing 88a extending from one side of the guide 1, Fig. 3. 88b is a spring for shifting the catch 88 out of the casing 88a, and 85a is a short arm on the check 85. In the normal or inactive position of the check as illustrated in Fig. 3, the catch 88 pushes the check 85 out of the way of the bar 84.

37 is a handle on the guide 1 for rocking it about the pivot 2. 150 is a column which is arranged near the rear end of the equalizing device. 80 151 is an arm which extends laterally from the column 150 in the direction in which the guide 1 is rocked into its inactive position, Fig. 3. 86 is a spring catch at the outer end of a casing 86a in which a spring 86b is housed. The casing 86a is secured on the pivot of the check 85. The catch 86 is adapted to cooperate with a check 87 on the arm 151, as will be described. The check 85 has a dog 34, and the column 150 has a stop 35 for the dog 34.

13 is a slide on the guide 1. 38 is a handle on the rear end of a shaft 38a which is mounted to oscillate in suitable bearings on the slide 13, and 90 is a hook on the front end of the shaft 38a. 14 is a check which is fixed on the guide 1 and is equipped with a pin 15 adapted to be engaged by the hook 90 when the slide 13 has been pushed home against the rear end of the check 14, as shown in Figs. 2 and 3. 16 is a rod which connects the slide 13 to the chuck frame 17 so that the slide, the chuck frame and the cam 9 move in unison and in parallel relation to the axis of the shaft 4. The weight 18 is raised by the cable 19, as shown in Fig. 2. 21 is a rod which is mounted to slide in the tube 17b against the action of a spring 29, its rear end projecting into the path of a lever 20 which is mounted to rock on the slide 13 under the action of a pull-back spring 20a. When the slide 13 is moved forward, the end of the lever 20 abuts against the end of the spring rod 21 and pushes the rod to the rear until the arm 23 of a bell-crank pawl which is fulcrumed in the bracket 29a at 23a (Fig. 5) engages in a recess 22 (Fig. 1) of the spring rod 21 with its free upper end under the action of a spring 24 acting on the shorter arm 23b of the pawl. Upon the further movement of the slide 13 into its final position in the forward direction, Fig. 2, a projection 20b on the arm 20 bears on a pin 25 of the check 14 and moves the free end of the lever 20 out of line with the spring rod 21, as shown in Fig. 2. The spring rod 21 is now free to move to the rear under the reaction of its spring 29 after the pawl 23 has been thrown out by the fixed cam 28 on the shaft 4, as will be described. 30 is a dog at the front end of the spring rod 21 for cooperation with the front end of the push rod 11.

When it is desired to insert a fresh bar 84 from the rear end of the guide 1, the guide is rocked about the pivot 2 into the charging position illustrated in Fig. 3 in which the axis of the guide is disaligned from the axis of the lathe 39. The rocking movement of the guide 1 causes the shaft 4 to rotate and the dog 7a on the arm 7 to cooperate with the arm 8 of the cam 9 so that the wedge member 12 descends by gravity and the chucking members 10 in the chuck frame release the push rod 11. The slide 13 is now pushed home against the check 14 and the hook 90 on its shaft 38a caused to engage the pin 15. The chuck frame 17 moves to the front end of its stroke with the slide 13, as shown in Figs. 2 and 3, the two members being connected by the rod 16. The weight 18 in the upright 5 is raised by the forwardly moving chuck frame 17. The advancing slide 13, with its lever 20, engages the rear end of the spring rod 21 and pushes the spring rod forward until the pawl 23 engages in its recess 22, Fig. 4. The spring 29 is now compressed and the dog 30 on the spring rod 21 is at the front end of its stroke. At the end of the movement of the slide 13 toward the check 14, the lever 20 is moved out of alignment with the spring rod 21 by the pin 25, Fig. 2, permitting the spring rod 21 to move to the rear after it has been released. When the guide 1 has moved into its outermost position, as shown in Fig. 3, the catch 86 is engaged by the check 87 on the arm 151 and the check 85 is moved out of the way to expose the rear end of the guide 1, being at the same time arrested by the other spring catch 88. A fresh bar 84 is now inserted from the rear end of the guide 1 and the push rod 11 is pushed forward by the bar 84. The chucking members 10 in the chuck frame 17 do not interfere with the forward movement of the push rod as they have been released by the wedge member 12 in the manner described. It will appear that the lengths of the individual bars 84 may vary within comparatively wide limits, the limits being indicated at A and B, in Fig. 2, the line A—B indicating the maximum variation of the length which is permitted.

When the fresh bar 84 has been inserted, the guide 1 is returned into its position of alignment with the spindle of the lathe 39. During the initial stage of the return movement (Fig. 6), the cooperation of the catch 86 with the check 87 on the arm 151 causes the check 85 to move into alignment with the guide 1 so that the fresh bar 84 is held against movement in backward direction. The shaft 4 is now reversed by the sector 6 and the pinion 3. The cam 28, Fig. 5, on the shaft 4 releases the locking of the spring rod 21 so that the spring 29 applies the dog 30 at the front end of the spring rod 21 to the push rod 11, applying its rear end to the front end of the bar 84, whose rear end, in turn, is retained by the check 85. Upon further movement of the guide 1 toward its position of alignment, the dog 31 on the lever 32 raises the arm 33 on the cam 9 and rotates the cam so as to raise the wedging member 12, causing the chucking members 10 in the chucking frame 17 to grip the push rod 11. When the guide 1 is almost in line with the spindle of the lathe 39, the dog 34 on the check 85 strikes the stop 35 and moves the check aside, in which position it is locked by the catch 88. Throw-over lever 36 may be provided for holding the guide 1 in its aligned position, as shown in Fig. 7. The handle 38 of shaft 38a on the slide 13 is now operated for releasing the connection of the slide 13 to the check 14 and the spring 29 is free to feed the fresh bar 84 to the lathe 39 where it is chucked and tooled in the usual manner.

The parts of the lathe 39 have been illustrated but will not be described as they form no part of the present invention. It may only be mentioned that 97 is a pulley on the driving shaft 97a of the lathe, and that the mechanism designated by the reference character "e" is an ejector for ejecting the waste ends of the bar stock from the lathe. Such an ejector is fully described in my co-pending application for patent of the United States, Serial No. 536,235, filed May 9, 1931, for "Machine tool".

The several other automatic movements which have been described, for instance, the automatic operation of the check 85, or the tensioning of the spring 29 of spring rod 21 by the slide 13, may be performed separately by manually operated means. On the other hand, means (not shown) might be provided for automatically releasing the connection of the slide 13 and the check 14 on the guide 1, for instance through the medium of the dog 34 on the check 85 as the dog strikes the stop 35.

Referring now to Figs. 8 to 11, certain parts which have been described with reference to Figs. 1 to 7, are also provided here but mechanical means are used for moving the push rod 11 into its final forward position, and a magazine 115 is provided for the bar stock from which, at the given time, a fresh bar is presented to the push rod 11.

The general arrangement of the device illustrated in Figs. 8 to 11 is similar to that described with reference to Figs. 1 to 7, but obviously, as the magazine 115 is provided, the rocking guide 1 is dispensed with in this device.

97 is the pulley on the driving shaft 97a of the lathe 39, as described. 97b is a pair of spur gears, sprockets or the like, by which the shaft 97a is connected to the shaft 98a of a worm 98 which is mounted in a suitable bracket on the rear column 150. 99 is a worm wheel which is free to rotate on a control shaft 55. Keyed on the control shaft 55 are a cam wheel 103, a cam 104 and a crank 105. These parts are adapted to be operatively connected to the worm wheel 99 by clutching means 99a under the control of a clutching cam 101 which is mounted to slide on the control shaft 55 under the action of a spring 100 but rotates with the shaft. The clutching cam is controlled by a pin 92 on the arm 52a of a T lever 52 which is fulcrumed on the frame of the lathe 39 at 53a. The spring 100 causes engagement of the clutching means 99a and positive connection of the shaft 55 and the members 103, 104, 105 on the shaft, to the worm wheel 99 when the pin 92 is disengaged from the clutching cam 101. The cam is so shaped that after a complete revolution the clutching means 99a are thrown out automatically and the parts 103, 104, and 105 are arrested.

By means which have not been illustrated, for instance, a feeler on the lathe 39 or by means which are operated when the feeding member (not shown) of the lathe slides off of the waste end of a bar, or by any other suitable means, the arm 52a of the T lever 52 is rocked to move its pin 92 away from the clutching cam 101 whereupon the shaft 55 is connected to the worm wheel 99 and the cam wheel 103, the cam 104 and the crank 105 are rotated. 51 is a double-armed lever which is operatively connected to the T 52 for throwing out a clutch 106 by which the main control shaft 107 of the lathe is operated.

109 is a slotted double-armed lever which is mounted to rock about a pin 109a on the upright 150. The crank 105 on the shaft 55 engages in the slotted lower end 108 of the lever 109. 110 is a sector at the opposite end of the lever 109 which meshes with a pinion 111 on a sheave 112 which is mounted to rotate on the upright 150. Mounted to rotate on the bracket 29a at the front end of the device is another sheave 113. 114 is a cable or the like which is supported on the sheaves. 61 is a slide which corresponds to the slide 13 in Figs. 1 to 7. This slide on which the lever 20 is mounted as described with reference to Figs. 1 to 7, with its pull-back spring 20a and projection 20b, is connected to the chuck frame 17 by the cable 114, so that the slide 61 and the chuck frame 17 move in unison, like the slide 13 and the chuck frame 17 in Figs. 1 to 7, which, it will be remembered, are connected by the rod 16.

When the double-armed lever 109 is rocked from the position shown in Fig. 8 into the position shown in Fig 10, i. e., anticlockwise, the slide 61 and the chuck frame 17 move together to the front end of their strokes, the lever 20 pushing the spring rod 21 and tensioning its spring 29, whereupon the spring rod is locked by the pawl 23 (Fig. 5), which is here mounted on the shaft 4. Finally, the lever 20 is moved out of the way of the spring rod 21 by the pin 25 which here is secured to the front upright or column 5.

The push rod 11 is mounted to slide in the chuck frame 17 as described with reference to Figs. 1 to 7, and adapted to be engaged by its chucking members 10 which are not shown in Figs. 8 and 10. 81 is a tubular spring holder which is secured to the top of the chuck frame 17, 80 is a spring in the holder 81, 81a is a slide in the holder against which the front end of the spring 80 is abutted, and 81b is an arm which projects through a slot in the holder 81 and connects the slide 81a to the front end of push rod 11.

The mechanism for operating the magazine 115 will now be described. The magazine is equipped with three holders for the bar stock but obviously might also be a single member of sheet metal or the like. It has a bottom slide 70 and a channel 72 for the reception of the bars dropped by the bottom slide 70. 69a is a shaft which is mounted in suitable bearings on the uprights 5 and 150. Mounted on the shaft 69a near its rear end is a double-armed lever 69 with a pin at its lower end which engages in the cam of the cam wheel 103. The upper end of lever 69 is pivotally connected to the bottom slide 70. 69b is a one-armed lever which is secured to the shaft 69a near the front end of the shaft, and also pivotally connected to the bottom slide 70 at its upper end.

74 is a lever which is fulcrumed on the upright 150 at one end and equipped with a pinion 116 on its pivot. 117 is a rack which meshes with the pinion 116 at its lower, and with a pinion 118 on the shaft 4 at its upper end. The free end of the lever 74 bears on the cam 104, and the groove in the cam wheel 103 and the cam 104 are so designed and arranged with respect to each other that when the bottom slide 70 is retracted and a bar 84 from the magazine 115 is dropped into the channel 72, the lever 74 is raised by the cam 104 and moves a check 77, Fig. 11, on the shaft, 4, in clock-wise direction so that it obstructs the rear end of channel 72 and retains the bar 84 in the channel. As soon as the shaft 4 is rotated by the rack 117 to present the check 77 to the channel 72, the arm 32 on the shaft 4 rotates the arm 33 on the cam 9 and causes the chucking members 10 in the chuck frame 17 to release the push rod 11. The spring 80 has been put under tension during the rearward movement of the slide 61 with the chuck frame 17 and now expands, moving the push rod 11 to the front end of its stroke, Fig. 10. The spring 80 is weaker than the spring 29 of the spring rod 21 which is released by the pawl 23 upon further rotation of the shaft 4. Spring 29 now expands and pushes the spring rod 21 to the rear. The rear end of the rod bears on the front end of the bar 84 in the channel 72 and applies the rear end of the bar to the check 77. The lever 74 is now allowed to descend by its cam 104 and the push rod 11 is gripped by the chucking members 10 in the chuck frame 17 in the position which corresponds to the length of this particular bar 84, by the described cooperation of the wedge member 12 with the cam 9, while at the same time the check 77 is retracted. Crank 105 now reverses the rocking lever 109 and causes the sheaves 112 and 113 to move the cable 114 to the rear, entraining the slide 61 and the chuck frame 17, the push rod 11 moving the fresh bar 84 into the lathe 39 under the action of spring rod 21.

When the control shaft 55 has completed a revolution, the pin 92 of lever 52, through the clutching cam 101, throws out the clutch 99a so that the shaft 55 ceases rotating while at the same time the clutch 106 for the control shaft 107 of the lathe 39 is thrown in.

Instead of arresting the control shaft 55 it might only be slowed down.

The movements under the control of the control shaft 55 might be effected by cam members mounted on the control shaft 107 of the lathe 39, or on any other suitable part, and operated in time as required.

The magazine may be modified and be operated by modified means (not shown).

Instead of gripping the push rod 11 in the chuck frame 17, the rod might be permanently connected to the chuck frame and the gripping or similar means might be provided for connecting the frame 17 to the rod 16 (Figs. 1 to 7) or to the cable 114 (Figs. 8 to 11). It is only important that in some way the rear end of the push rod 11 should be adjusted as required by the variations in the lengths of the bars 84, and be connected to the means for pushing the rod 11, with the bar 84, to the rear, with the object set out, i. e. presenting the bars to the tools at the tooling station exactly in the position required, notwithstanding considerable variations in their individual lengths, so that each bar projects from the chucking means of the lathe, or other machine tool, exactly for the prescribed distance at the tooling station.

I wish it to be understood that I do not desire to be limited to the exact details of construction shown and described for obvious modifications will occur to a person skilled in the art.

I claim:—

1. In a device for feeding bar stock to machine tools in combination a push rod for pushing bars from the stock toward the machine tool, means for applying said push rod to the front end of a bar and for moving said push rod toward the machine tool with the bar, means for presenting the push rod to said push-rod moving means, and means for making and breaking the operative connection of said rod-presenting means and said push rod.

2. In a device for feeding bar stock to machine tools in combination a push rod for pushing bars from the stock toward the machine tool, means for applying said push rod to the front end of a bar and for moving said push rod toward the machine tool with the bar, means for presenting the push rod to said push-rod moving means, and automatic means for making and breaking the operative connection of said rod-presenting means and said push rod.

3. In a device for feeding bar stock to machine tools in combination a push rod for pushing bars from the stock toward the machine tool, a guide for the bars which is adapted to be aligned and disaligned with respect to the axis of the device and the machine tool, means for applying said push rod to the front end of a bar and for moving said push rod toward the machine tool with the bar in said guide, means for presenting the push rod to said push-rod moving means, and means controlled by the movement of said guide for making and breaking the operative connection of said rod-presenting means and said push rod.

4. In a device for feeding bar stock to machine tools in combination a push rod for pushing bars from the stock toward the machine tool, a rod controlled by resilient means for applying said push rod to the front end of a bar and for moving said push rod toward the machine tool, means for presenting the push rod to said resiliently controlled rod, and means for making and breaking the operative connection of said rod-presenting means and said push rod.

5. In a device for feeding bar stock to machine tools in combination a push rod for pushing bars from the stock toward the machine tool, a rod controlled by resilient means for applying said push rod to the front end of a bar and for moving said push rod toward the machine tool, means for retaining the rear end of the bar against the action of said resilient means, means for presenting the push rod to said resiliently controlled rod, means for making and breaking the operative connection of said rod-presenting means and said push rod, and means for throwing out said retaining means in time with the operation of said making and breaking means.

6. In a device for feeding bar stock to machine tools in combination a push rod for pushing bars from the stock toward the machine tool, a rod controlled by resilient means for applying said push rod to the front end of a bar and for moving said push rod toward the machine tool, means for retaining the rear end of the bar against the action of said resilient means, means for presenting the push rod to said resiliently controlled rod, means for displacing said rod-presenting means and for putting said resilient means under tension, means for locking said resiliently controlled rod, means for making and breaking the operative connection of said rod-presenting means and said push rod, means for throwing out said retaining means in time with the operation of said making and breaking means, and means for releasing said locking means in time with the operation of said making and breaking means.

7. In a device for feeding bar stock to machine tools in combination a magazine for receiving the bar stock, a push rod for pushng bars from the stock toward the machine tool, means for applying said push rod to the front end of a bar and for moving said push rod toward the machine tool with the bar, means for presenting the push rod to said push-rod moving means, means for making and breaking the operative connection of said rod-presenting means and said push rod, and mechanism under the control of said making and breaking means for delivering bars from said magazine to said push rod.

8. In a device for feeding bar stock to machine tools in combination a push rod for pushing bars from the stock toward the machine tool, a rod arranged in parallel relation to said push rod, a dog on said parallel rod for engaging said push rod, means for moving said parallel rod toward the machine tool, means for locking and releasing said parallel rod, said parallel rod being adapted to be applied to the front end of a bar from the stock, a chuck frame in which said push rod is mounted to slide, a check for retaining the bar against the action of the means for moving said parallel rod, and means for gripping said push rod in said chuck frame.

KARL TESSKY.